(12) United States Patent
Daniel

(10) Patent No.: US 8,991,696 B1
(45) Date of Patent: Mar. 31, 2015

(54) ELECTRONIC CORPORATE CREDIT SYSTEM AND BIOMETRIC IDENTIFICATION AND DOCUMENTATION CARD

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 4 days.

(21) Appl. No.: 13/888,202

(22) Filed: May 6, 2013

Related U.S. Application Data

(63) Continuation-in-part of application No. 13/041,974, filed on Mar. 7, 2011, now Pat. No. 8,517,263.

(60) Provisional application No. 61/643,121, filed on May 4, 2012.

(51) Int. Cl.
 *G06K 5/00* (2006.01)
 *G06Q 40/02* (2012.01)

(52) U.S. Cl.
 CPC ..................................... *G06Q 40/02* (2013.01)
 USPC .............................. 235/380; 382/77; 382/115

(58) Field of Classification Search
 USPC ..................................... 235/380; 382/77, 115
 See application file for complete search history.

(56) References Cited

U.S. PATENT DOCUMENTS

| | | | |
|---|---|---|---|
| 6,776,332 B2 | 8/2004 | Allen et al. | |
| 7,131,583 B2 | 11/2006 | Jaros et al. | |
| 2004/0179718 A1* | 9/2004 | Chou | 382/115 |
| 2005/0038737 A1 | 2/2005 | Norris | |
| 2008/0308625 A1* | 12/2008 | Harris | 235/380 |
| 2009/0309701 A1* | 12/2009 | Peled | 340/5.83 |
| 2010/0118131 A1* | 5/2010 | Lee et al. | 348/77 |
| 2012/0067949 A1* | 3/2012 | Harris | 235/380 |

FOREIGN PATENT DOCUMENTS

WO 2004059586 B1 9/2004

* cited by examiner

*Primary Examiner* — Allyson Trail
(74) *Attorney, Agent, or Firm* — Isaac Daniel Group, Inc.

(57) ABSTRACT

An electronic corporate credit system that includes a biometric corporate identification and documentation card which is associated with transmitting, verifying and interfacing with an agent of a corporate entity, a biometric reader operative to collect a biometric identifier from the agent, a storage module operative to store information and documentation about the corporate entity, a first communications module operative, a card reader associated with a credit-extending entity including a card interface operative to interface, a second communications module for receiving and transmitting biometric identifier information and documentation, a verification system for verifying and receiving the at least one agent's identity and authority to act on behalf of the corporate entity, verifying the accuracy of the information and documentation, and a display device connected to the card reader and operative to display the information and documentation about the corporate entity to an agent of the credit-extending entity.

25 Claims, 6 Drawing Sheets

US 8,991,696 B1

ELECTRONIC CORPORATE CREDIT SYSTEM AND BIOMETRIC IDENTIFICATION AND DOCUMENTATION CARD

PRIORITY CLAIM

This patent application is a non-provisional patent application and claims priority under 35 U.S.C. §119(e) to: U.S. Provisional Patent Application Ser. No. 61/643,121 titled "Electronic Corporate Credit System and Biometric Identification and Documentation Card" filed May 4, 2012, and is a continuation-in-part of U.S. patent application Ser. No. 13/041,974, titled "System and Method for Verifying an Individual's Authorization to Cross Borders Using an Electronic Card with Biometric Controls," filed Mar. 7, 2011, which are hereby incorporated by reference as if fully stated herein.

FIELD

The present disclosure relates generally to electronic systems and methods, and particularly to systems and methods for the application, issuance, and management of corporate credit services.

BACKGROUND

In many countries, particularly third world and developing countries, archaic systems for obtaining credit for corporations are in place, wherein corporations must complete a tremendous amount of documentation and submit it to the banks that they seek to obtain credit from. In turn, the companies or banks that will be extending the credit must then comb through the documentation and not only review and process the information contained therein, but also confirm the veracity of the information. Such processes often lead to bureaucracy and delays for companies seeking to obtain credit.

SUMMARY

The systems and methods disclosed herein result from the realization that the process of obtaining credit may be streamlined by providing an electronic system for credit processing comprising of an electronic biometric identification and documentation card issued to a corporate entity, wherein the documentation card has all of the documentation necessary for applying for corporate credit digitally stored, card reader issued to a credit-extending entity, such as a bank, and a central system for verifying the identification cards and managing the credit process.

Accordingly, the various embodiments and disclosures described herein solve the limitations of the prior art in a new and novel manner.

DETAILED DESCRIPTION OF PREFERRED EMBODIMENTS

Figure 1A:
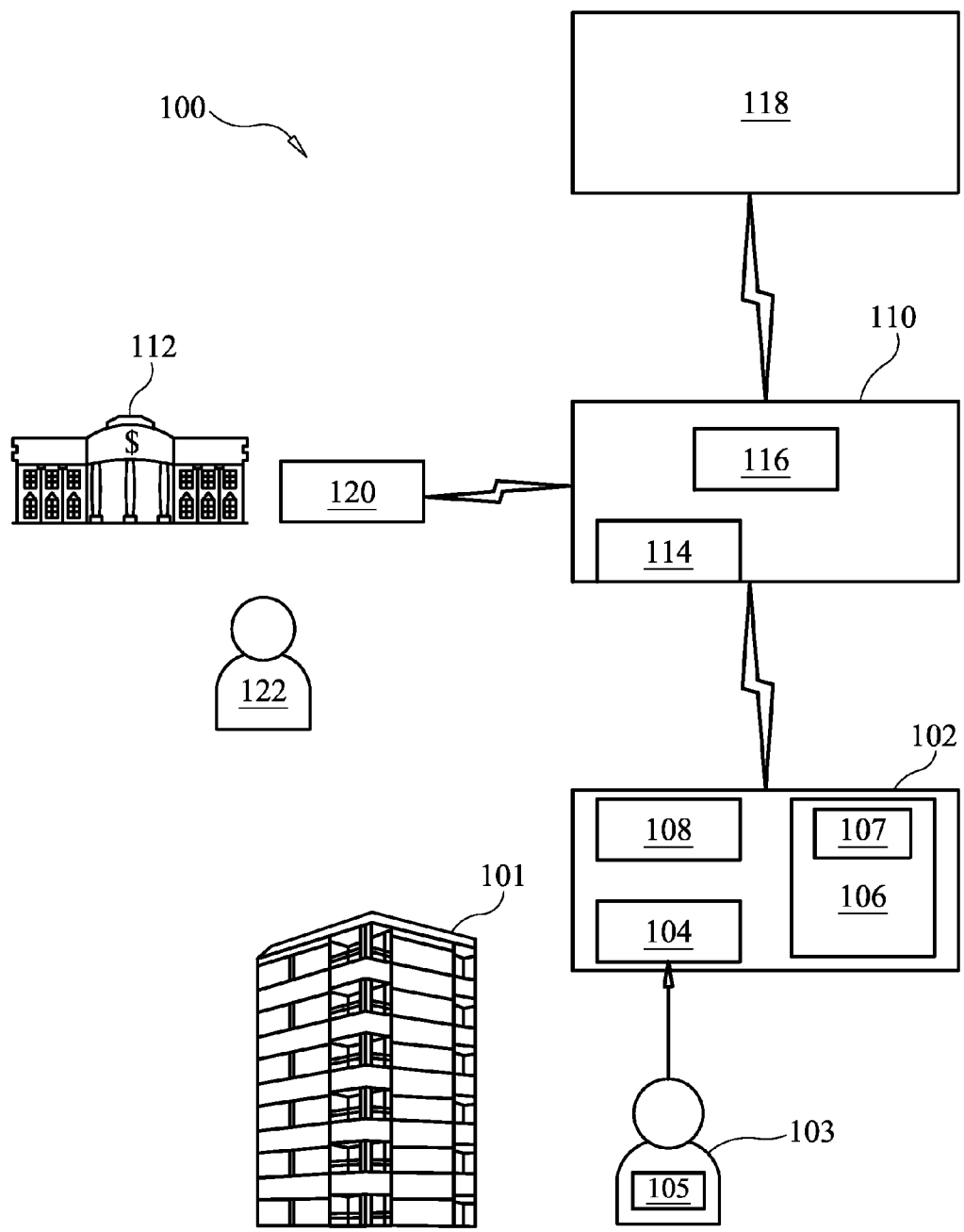
FIGS. 1A and 1B show a system in accordance with one embodiment.
Figure 1B:
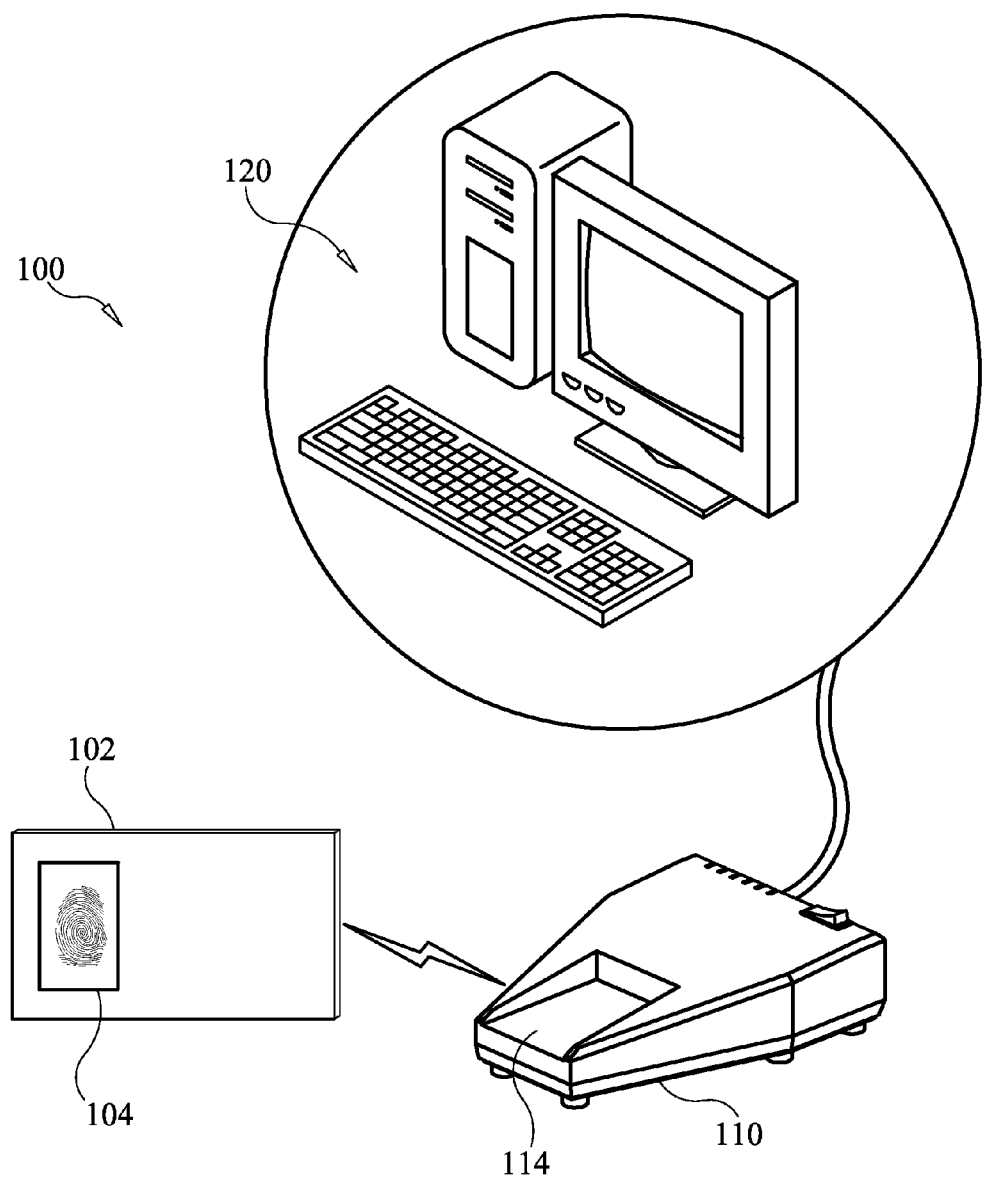

FIGS. 1A and 1B show an electronic corporate credit system 100, in accordance with one embodiment, comprising a biometric corporate identification and documentation card 102 (hereinafter referred to simply as "card"), wherein card 102 is associated with at least one agent 103 of a corporate entity 101, and comprises a biometric reader 104 to collect a biometric identifier 105 from at least one agent 103, a storage module 106 operative to store information and documentation 107 about corporate entity 101, and a first communications module 108 operative to transmit biometric identifier 105 and information and documentation 107 about corporate entity 101, a card reader 110 associated with a credit-extending entity 112, comprising a card interface 114 operative to interface with card 102, a second communications module 116 for receiving biometric identifier 105 and information and documentation 107 about corporate entity 101 from card 102, and transmit biometric identifier 105 and information and documentation 107 about corporate entity 101, a verification system 118 for receiving biometric identifier 105 and information and documentation 107 about corporate entity 101, and verifying at least one agent 103's identity and authority to act on behalf of corporate entity 101, and verify the accuracy of the information and documentation 107, and a display device 120 connected to card reader 110 and operative to display the information and documentation 107 about corporate entity 101 to an agent 122 of the credit-extending entity 112.

In some embodiments, the card 102 comprises at least one processor that is connected to biometric 104, storage module 106, or first communications module 108, and is operative to perform, or help perform, the various functions of the components of card 102. In another embodiment, card 102 may comprise computer executable readable by the at least one processor and operative to use the various components of card 102 to fulfill their various functions. Card 102 may comprise a power source, such as a battery. Card 102 may further comprise a unique means for identifying card 102, such as a unique identification module. Card 102 may further comprise a means for connecting a power source, wherein said means may comprise a port, terminals, power inductors, and the like. The power source may comprise a battery or a power supply. The means for connecting a power source may be integrated with first communications module 108, and may be operative to interface with card interface 114.

In some embodiments, at least one agent 103 comprises an employee, officer, attorney, or the like, of corporate entity 101.

Biometric reader 104 may comprise any type of electronic biometric reader, including, but not limited to, a fingerprint reader, a voice recognition reader, which may include a microphone, or an iris scanner. Accordingly, biometric identifier 105 may comprise any type of biometric identifier, including, but not limited to, a fingerprint, a voice, an iris, and the like.

Storage module 106 may comprise any type of means for storing digital information, such as a computer readable medium, including, but not limited to, flash memory, solid state memory, and the like. Information about corporate entity 101 may comprise any type of information, including, but not limited to, financial information, such as asset value, outstanding debts, liabilities, revenue, and the like, biographical information, such as corporate location(s), employees, size, history, affiliate/parent/subsidiary information, and the like, tax information, such as income tax paid, and the like, government information, such as governmental identification number (e.g. EIN, CNPJ, etc.), or legal information, such as information related to litigation, settlements, corporate structure, and the like. Documentation about corporation 101 may comprise digital versions of financial documentation, such as financial reports, legal and/or governmental documentation, such as government status certificates, identification certificates (e.g. EIN and CNPJ certificates, etc.), business licenses, and the like.

First communications module 108 may comprise a wired or physical communications module, such as a communications terminal, electrical contacts, spring loaded contacts, and the like. In other embodiments, communications module 108 may comprise a wireless communications module, such as a near field communications module, and the like.

Card interface 114 on card reader 110 may comprise any means for interfacing with card 102, such as a slot, a flat surface, and the like. Card interface 114 may further comprise a near field communications module, electrical/communications terminal, contacts, or spring loaded contacts. Card interface 114 may be operative to connect or communications with first communications module 108, or means for connecting power source on card 102.

Second communications module 116 may comprise a wired or wireless communications module, such as but not limited to, a modem, a network card, and the like. Second communications module 116 may be operative to communicate over a communications network, such as a telephone or data network, such as a computer network, wide area network, local area network, or the internet.

Card reader 110 may comprise a means for transmitting power to card 102 via the means for connecting a power source on card 102. The means for transmitting power may comprise a wired or physical means, such as a terminal, contacts, spring loaded contacts, and the like. In an alternate embodiment, the means for transmitting power may comprise a wireless means for transmitting power, such as a magnetic or electrical induction system or coil. In some embodiments, the means for transmitting power may be integrated with card interface 114, and may be operative to interface with the means for connecting power source on card 102.

In some embodiments, verification system 118 may comprise a verification computer system, such as a server, and the like. Verification system 118 may comprise a governmental entity, or a third party verification system. In some embodiments, verification system 118 may be connected to card reader 110 via a communications network, such as a computer network, telephone network, the internet, and the like.

In some embodiments, verifying the at least one agent 103's identity comprises receiving biometric identifier 105 from card reader 110, comparing biometric identifier 105 to a database of biometric identifiers belonging to authorized agents. In another embodiment, verifying the accuracy of the information and documentation 107 comprises comparing information and documentation 107 to a database of accurate, and up-to-date information and documentation, which may include governmental databases.

Display device 120 may comprise any type of display device, such as a screen or monitor, and may be connected to card reader 110. Display device 120 may also be connected to a computer connected to card reader 110.

In some embodiments, agent 122 may comprise a loan officer at a bank, and credit-extending entity may comprise a bank or other financial institution.

In some embodiments, any or all of the components of system 100 may comprise those embodiments described herein with reference to FIGS. 2A through 4.

Figure 2A:
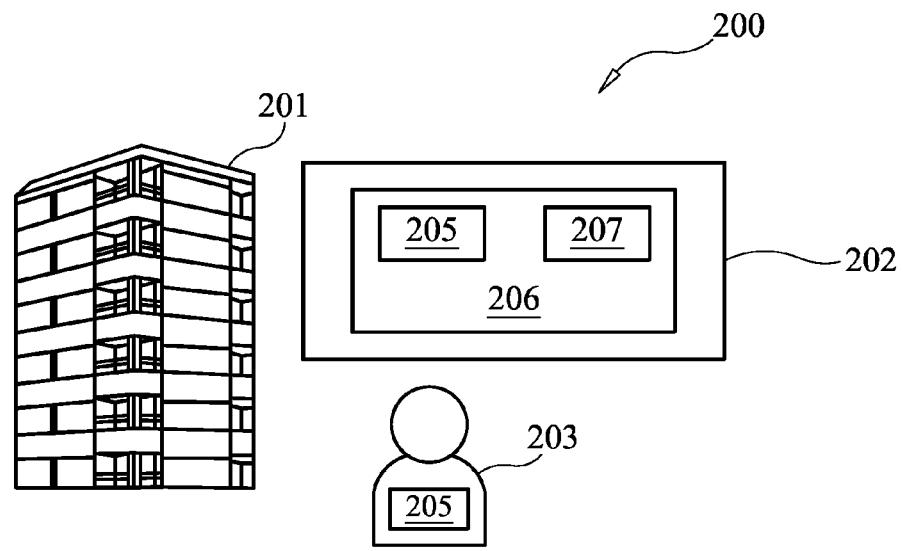
FIGS. 2A and 2B show a system in accordance with one embodiment.

Referring now to FIG. 2A, an system 200 is shown in accordance with one embodiment, wherein system 200 may comprise a biometric corporate identification and documentation card 202 (hereinafter referred to simply as "card"), wherein card 202 is associated with at least one agent 203 of a corporate entity 201, and comprises a storage module 206 operative to store a biometric identifier 205 associated with at least one agent 203, and information and documentation 207 about corporate entity 201.

Figure 2B:
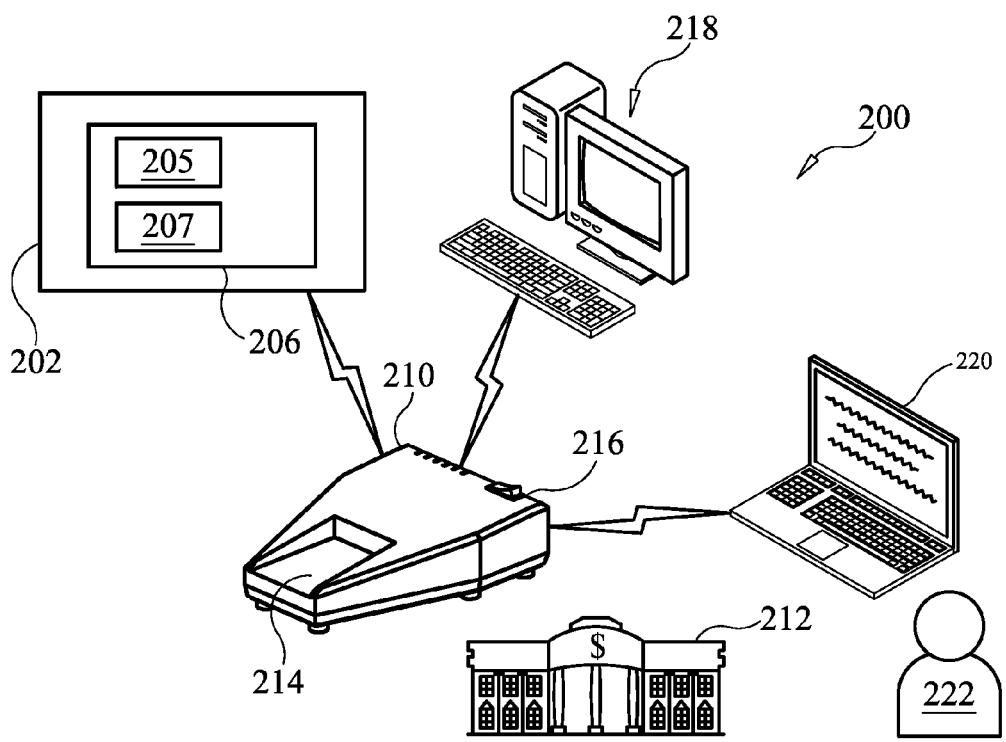

In some embodiments, as shown in FIG. 2B, system 200 may comprise a card reader 210 associated with a credit-extending entity 212, comprising a card interface 214 operative to interface with card 202, a communications module 216 for transmitting biometric identifier 205 and information and documentation 207 about corporate entity 201.

In some embodiments, system 200 may further comprise a verification system 218 for receiving biometric identifier 205 and information and documentation 207 about corporate entity 201, and verifying at least one agent 203's identity and authority to act on behalf of corporate entity 201, and verify the accuracy of the information and documentation 207.

In yet another embodiment, system 200 may further comprise a display device 220 connected to card reader 210 and operative to display the information and documentation 207 about corporate entity 201 to an agent 222 of the credit-extending entity 212.

In some embodiments, the card 202 comprises at least one processor that is connected to storage module 206, a communications module on the card, or a biometric reader on the card, and is operative to perform, or help perform, the various functions of the components of card 202. In another embodiment, card 202 may comprise computer executable readable by the at least one processor and operative to use the various components of card 202 to fulfill their various functions. Card 102 may comprise a power source, such as a battery. Card 102 may further comprise a unique means for identifying card 202, such as a unique identification module. Card 202 may further comprise a means for connecting a power source, wherein said means may comprise a port, terminals, power inductors, and the like. The power source may comprise a battery or a power supply. The means for connecting a power source may be integrated with a communications module connected to card 202, and may be operative to interface with card interface 214.

In some embodiments, at least one agent 203 comprises an employee, officer, attorney, or the like, of corporate entity 201.

In some embodiments, card 202 and/or card reader 210 may comprise a biometric reader 204. In some embodiments, biometric reader 204 may comprise any type of electronic biometric reader, including, but not limited to, a fingerprint reader, a voice recognition reader, which may include a microphone, or an iris scanner. Accordingly, biometric identifier 205 may comprise any type of biometric identifier, including, but not limited to, a fingerprint, a voice, an iris, and the like.

Storage module 206 may comprise any type of means for storing digital information, such as a computer readable medium, including, but not limited to, flash memory, solid state memory, and the like. Information about corporate entity 201 may comprise any type of information, including, but not limited to, financial information, such as asset value, outstanding debts, liabilities, revenue, and the like, biographical information, such as corporate location(s), employees, size, history, affiliate/parent/subsidiary information, and the like, tax information, such as income tax paid, and the like, government information, such as governmental identification number (e.g. EIN, CNPJ, etc.), or legal information, such as information related to litigation, settlements, corporate structure, and the like. Documentation about corporation 201 may comprise digital versions of financial documentation, such as financial reports, legal and/or governmental documentation, such as government status certificates, identification certificates (e.g. EIN and CNPJ certificates, etc.), business licenses, and the like.

A communications module may comprise a wired or physical communications module, such as a communications terminal, electrical contacts, spring loaded contacts, and the like. In other embodiments, a communications module may comprise a wireless communications module, such as a near field communications module, WLAN module, Bluetooth® module, and the like.

Card interface 214 on card reader 210 may comprise any means for interfacing with card 202, such as a slot, a flat surface, and the like. Card interface 214 may further comprise a near field communications module, electrical/communications terminal, contacts, or spring loaded contacts. Card interface 214 may be operative to connect or communicate with a communications module on card 202, or means for connecting a power source on card 202.

Communications module 216 may comprise a wired or wireless communications module, such as but not limited to, a modem, a network card, WLAN module, and the like. Communications module 216 may be operative to communicate over a communications network, such as a telephone or data network, such as a computer network, wide area network, local area network, or the internet.

Card reader 210 may comprise a means for transmitting power to card 202 via the means for connecting a power source on card 202. The means for transmitting power may comprise a wired or physical means, such as a terminal, contacts, spring loaded contacts, and the like. In an alternate embodiment, the means for transmitting power may comprise a wireless means for transmitting power, such as a magnetic or electrical induction system or coil. In some embodiments, the means for transmitting power may be integrated with card interface 214, and may be operative to interface with the means for connecting power source on card 202.

In some embodiments, verification system 218 may comprise a verification computer system, such as a server, and the like. Verification system 218 may comprise a governmental entity, or a third party verification system. In some embodiments, verification system 218 may be connected to card reader 210 via a communications network, such as a computer network, telephone network, the internet, and the like.

In some embodiments, verifying the at least one agent 203's identity comprises receiving biometric identifier 205 from card reader 210, comparing biometric identifier 205 to a database of biometric identifiers belonging to authorized agents. In another embodiment, verifying the accuracy of the information and documentation 207 comprises comparing information and documentation 207 to a database of accurate, and up-to-date information and documentation, which may include governmental databases.

Display device 220 may comprise any type of display device, such as a screen or monitor, and may be connected to card reader 210. Display device 220 may also be connected to a computer connected to card reader 210.

In some embodiments, agent 222 may comprise a loan officer at a bank, and credit-extending entity may comprise a bank or other financial institution.

In some embodiments, any or all of the components of system 200 may comprise those embodiments described herein with reference to FIGS. 1A, 1B, 3A, 3B, and 4.

Figure 3A:
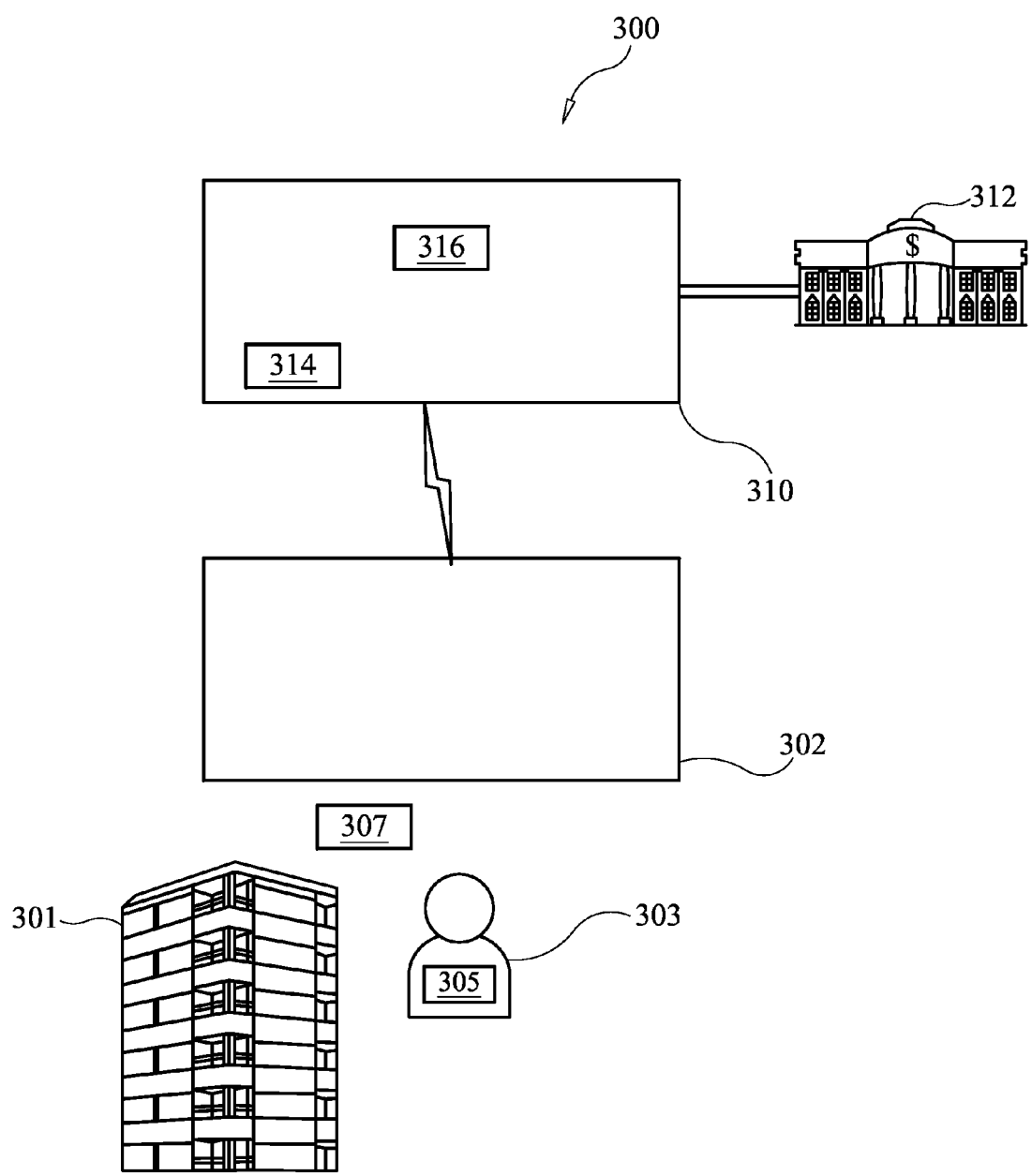
FIGS. 3A and 3B show a system in accordance with another embodiment.

Referring now to FIG. 3A, an system 300 is shown in accordance with one embodiment, wherein system 300 may comprise a card reader 310 associated with a credit-extending entity 312, comprising a card interface 314 operative to interface with a biometric corporate identification and documentation card 302 (hereinafter referred to simply as "card"), a communications module 316 for transmitting a biometric identifier 305 associated with at least one agent 303 of a corporate entity 301 and information and documentation 307 about corporate entity 301.

Figure 3B:
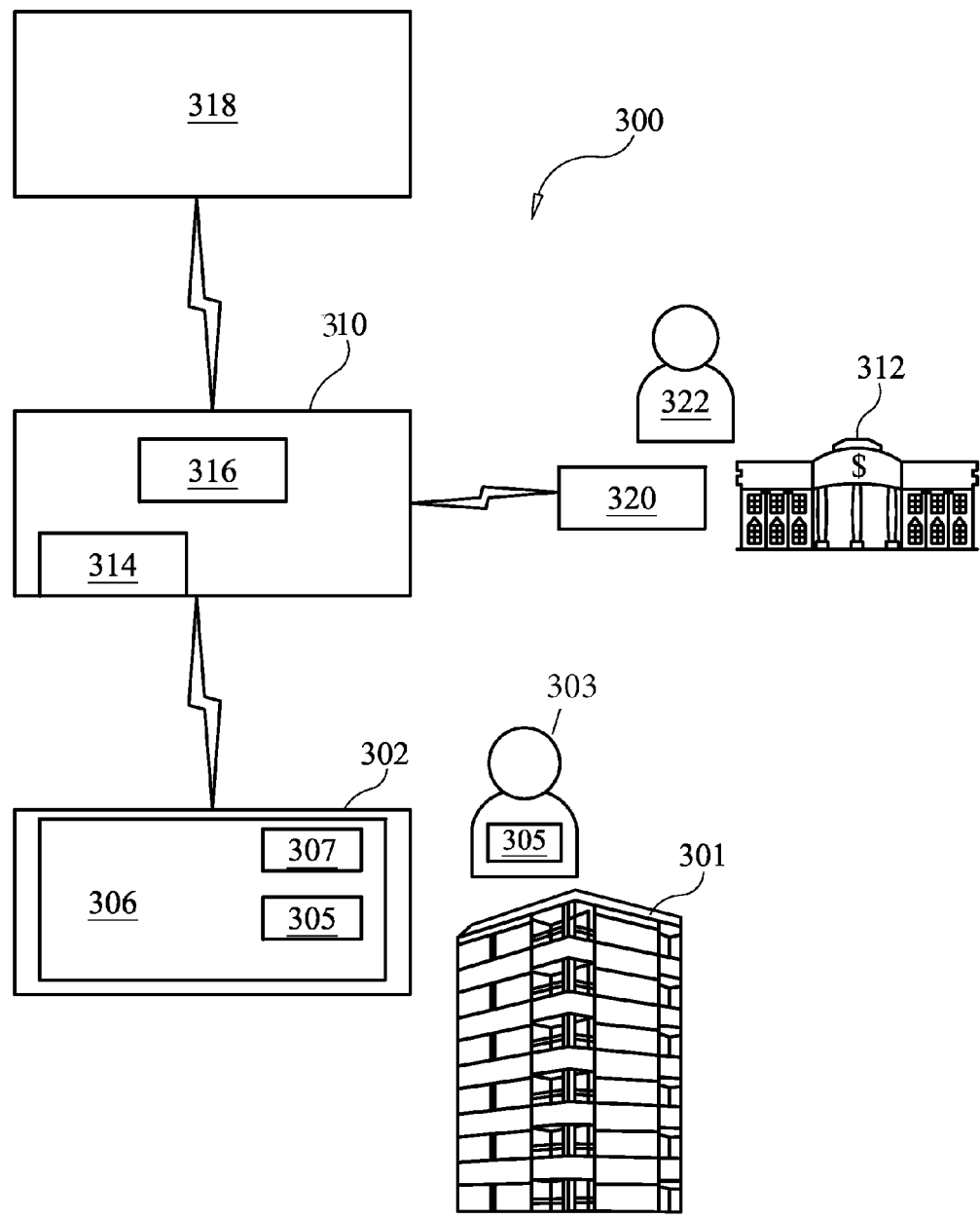

In some embodiments, as shown in FIG. 3B, card 302 may be associated with at least one agent 303 of a corporate entity 301, and may comprise a storage module 306 operative to store a biometric identifier 305 associated with at least one agent 303, and information and documentation 307 about corporate entity 301.

In some embodiments, system 300 may further comprise a verification system 318 for receiving biometric identifier 305 and information and documentation 307 about corporate entity 301, and verifying at least one agent 303's identity and authority to act on behalf of corporate entity 301, and verify the accuracy of the information and documentation 307.

In yet another embodiment, system 300 may further comprise a display device 320 connected to card reader 310 and operative to display the information and documentation 307 about corporate entity 301 to an agent 322 of the credit-extending entity 212.

In some embodiments, the card 302 may comprise at least one processor that is connected to a storage module 306, a communications module on the card, or a biometric reader on the card, and is operative to perform, or help perform, the various functions of the components of card 302. In another embodiment, card 302 may comprise computer executable readable by the at least one processor and operative to use the various components of card 302 to fulfill their various functions. Card 302 may comprise a power source, such as a battery. Card 302 may further comprise a unique means for identifying card 302, such as a unique identification module. Card 302 may further comprise a means for connecting a power source, wherein said means may comprise a port, terminals, power inductors, and the like. The power source may comprise a battery or a power supply. The means for connecting a power source may be integrated with a communications module connected to card 302, and may be operative to interface with card interface 314.

In some embodiments, at least one agent 303 comprises an employee, officer, attorney, or the like, of corporate entity 301.

In some embodiments, card 302 and/or card reader 310 may comprise a biometric reader 304. In some embodiments, biometric reader 304 may comprise any type of electronic biometric reader, including, but not limited to, a fingerprint reader, a voice recognition reader, which may include a microphone, or an iris scanner. Accordingly, biometric identifier 305 may comprise any type of biometric identifier, including, but not limited to, a fingerprint, a voice, an iris, and the like.

Storage module 306 may comprise any type of means for storing digital information, such as a computer readable medium, including, but not limited to, flash memory, solid state memory, and the like. Information about corporate entity 301 may comprise any type of information, including, but not limited to, financial information, such as asset value, outstanding debts, liabilities, revenue, and the like, biographical information, such as corporate location(s), employees, size, history, affiliate/parent/subsidiary information, and the like, tax information, such as income tax paid, and the like, government information, such as governmental identification number (e.g. EIN, CNPJ, etc.), or legal information, such as information related to litigation, settlements, corporate structure, and the like. Documentation about corporation 301 may comprise digital versions of financial documentation, such as financial reports, legal and/or governmental documentation, such as government status certificates, identification certificates (e.g. EIN and CNPJ certificates, etc.), business licenses, and the like.

A communications module may comprise a wired or physical communications module, such as a communications terminal, electrical contacts, spring loaded contacts, and the like. In other embodiments, a communications module may comprise a wireless communications module, such as a near field communications module, WLAN module, Bluetooth® module, and the like.

Card interface 314 on card reader 310 may comprise any means for interfacing with card 302, such as a slot, a flat surface, and the like. Card interface 314 may further comprise a near field communications module, electrical/communications terminal, contacts, or spring loaded contacts. Card interface 314 may be operative to connect or communicate with a communications module on card 302, or means for connecting a power source on card 302.

Communications module 316 may comprise a wired or wireless communications module, such as but not limited to, a modem, a network card, WLAN module, and the like. Communications module 316 may be operative to communicate over a communications network, such as a telephone or data network, such as a computer network, wide area network, local area network, or the internet.

Card reader 310 may comprise a means for transmitting power to card 302 via the means for connecting a power source on card 302. The means for transmitting power may comprise a wired or physical means, such as a terminal, contacts, spring loaded contacts, and the like. In an alternate embodiment, the means for transmitting power may comprise a wireless means for transmitting power, such as a magnetic or electrical induction system or coil. In some embodiments, the means for transmitting power may be integrated with card interface 314, and may be operative to interface with the means for connecting power source on card 302.

In some embodiments, verification system 318 may comprise a verification computer system, such as a server, and the like. Verification system 318 may comprise a governmental entity, or a third party verification system. In some embodiments, verification system 318 may be connected to card reader 310 via a communications network, such as a computer network, telephone network, the internet, and the like.

In some embodiments, verifying the at least one agent 303's identity comprises receiving biometric identifier 305 from card reader 310, comparing biometric identifier 305 to a database of biometric identifiers belonging to authorized agents. In another embodiment, verifying the accuracy of the information and documentation 307 comprises comparing information and documentation 307 to a database of accurate, and up-to-date information and documentation, which may include governmental databases.

Display device 320 may comprise any type of display device, such as a screen or monitor, and may be connected to card reader 310. Display device 320 may also be connected to a computer connected to card reader 310.

In some embodiments, agent 322 may comprise a loan officer at a bank, and credit-extending entity may comprise a bank or other financial institution.

In some embodiments, any or all of the components of system 300 may comprise those embodiments described herein with reference to FIGS. 1A-2B, and 4.

Exemplary Implementation

The various embodiments, or components thereof, may be implemented in the following exemplary manner: an authorized agent of a corporate entity may be provided with a biometric corporate identification and documentation card, wherein the card is associated with the agent and contains electronic information and documentation associated with the corporate entity. The card may further contain a biometric identifier associated with the agent, wherein the biometric identifier may be loaded onto the card by having the agent use a biometric reader/writer on the card to read and load the biometric identifier, or use an external biometric reader, such as one connected to a card reader, to read the biometric identifier and load it onto the card. The term "card reader" as used herein, may refer to a device that is capable of reading, writing, or editing information stored on an electronic card. In some embodiments, providing the card to the agent and registering the card with the agent may occur when an agent establishes an account with the credit extending entity. In another embodiment, the card may be registered and issued by a governmental or credit authority.

After having been provided with the card, the agent visits a credit extending entity (such as a bank or other financial institution) to apply for credit on behalf of the corporate entity. Once there, the credit extending entity may request that the agent present the card. Using a card reader, the credit extending entity may retrieve from the card any information that is needed to process a credit application for the corporate entity. In addition, the credit extending entity may verify the agent's identity and authorization by using a biometric reader to read the agent's biometric identifier and comparing the captured biometric identifier with an authorized and verified identifier contained in a database. The biometric reader may be part of the card, or part of a card reader.

The information (including the corporate information and biometric identifier) may be transmitted to a credit analysis and/or approval system, such as a remote computer or local computer for analysis and approval. Once the information and biometric identifier has been reviewed and verified, the corporate entity's credit application may be approved or denied.

Any changes to the information on the card may be made using the card reader. In some embodiments, an updated credit history relating to the corporate entity may be maintained on the card.

The previously described systems and methods may be used to reduce the amount of paperwork generated in the credit application/approval process, such as forms and other credit application associated documentation. However, such embodiments may be used in other applications that involve completing paperwork, such as activities of state motor vehicles offices, driver's license applications/renewals, passport applications/renewals, visa applications/renewals, border entries, criminal infraction citations, such as traffic stops by police, doctor's office visits, hotel registrations, rental car applications, liability waiver forms, credit card applications, loan applications, auto loan applications, and the like. It should be noted that the card may also be associated with an individual, and not necessarily a corporate entity.

Hardware and Operating Environment

This section provides an overview of example hardware and the operating environments in conjunction with which embodiments of the inventive subject matter can be implemented. A software program may be launched from a computer readable medium in a computer-based system to execute the functions defined in the software program. Various programming languages may be employed to create software programs designed to implement the systems disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 4 below.

Figure 4:
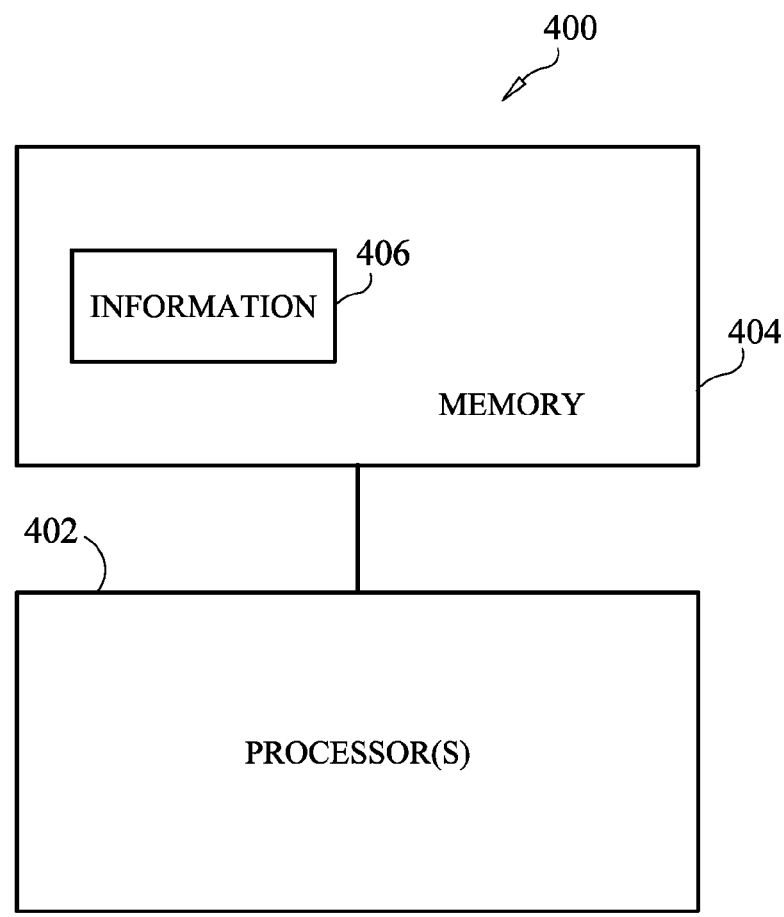
FIG. 4 shows a block diagram representing an apparatus in accordance with one embodiment.

FIG. 4 is a block diagram representing an apparatus 400 according to various embodiments. Such embodiments may comprise a computer, a memory system, a magnetic or optical disk, some other storage device, or any type of electronic device or system. The apparatus 400 may include one or more processor(s) 402 coupled to a machine-accessible medium such as a memory 404 (e.g., a memory including electrical, optical, or electromagnetic elements). The medium may contain associated information 406 (e.g., computer program instructions, data, or both) which, when accessed, results in a machine (e.g., the processor(s) 402) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An electronic corporate credit system comprising:
a biometric corporate identification and documentation card, wherein the biometric corporate identification and documentation card is associated with at least one agent of a corporate entity and includes all documentation necessary for applying for corporate credit digitally stored thereon, and comprises:
a biometric reader operative to collect a biometric identifier from the at least one agent; and
a storage module operative to store information and documentation about the corporate entity; and
a card reader associated with a credit-extending entity, comprising:
a card interface operative to interface with the biometric corporate identification and documentation card;
a communications module for receiving the biometric identifier and information and documentation about the corporate entity from the biometric corporate identification and documentation card, and transmitting the biometric identifier and information and documentation about the corporate entity;
a verification computer system, including a server, configured for receiving the biometric identifier and information and documentation about the corporate entity from the biometric corporate identification and documentation card, and determining credit eligibility based on verifying the at least one agent's identity and authority to act on behalf of the corporate entity, and verifying the accuracy of the information and documentation received from the biometric corporate identification and documentation card; and
a display device connected to the card reader and operative to display the information and documentation about the corporate entity to an agent of the credit-extending entity.

2. The system of claim 1, wherein the biometric corporate identification and documentation card comprises a means for connecting a power source.

3. The system of claim 2, wherein the card reader comprises a means for transmitting power to the biometric corporate identification and documentation card via the means for connecting a power source.

4. The system of claim 1, wherein information about the corporate entity comprises financial information, biographical information, tax information, governmental information, or legal information.

5. The system of claim 1, wherein documentation about the corporation comprises digital versions of financial, legal, and governmental documents.

6. A system comprising:
a biometric corporate identification and documentation card, wherein the biometric corporate identification and documentation card is associated with at least one agent of a corporate entity, and comprises:
a storage module operative to store a biometric identifier associated with the at least one agent, and all information and documentation about the corporate entity necessary for applying for corporate credit digitally stored thereon; and
a verification computer system, including a server, configured for determining credit eligibility based on verification of the at least one agent's identity and authority to act on behalf of the corporate entity, and verifying the accuracy of the information and documentation received from the biometric corporate identification and documentation card.

7. The system of claim 6, further comprising a card reader associated with a credit-extending entity, comprising:
a card interface operative to interface with the biometric corporate identification and documentation card; and
a communications module for transmitting the biometric identifier and information and documentation about the corporate entity.

8. The system of claim 7, wherein the card reader comprises a biometric reader operative to collect a biometric identifier from the at least one agent.

9. The system of claim 6, further comprising a verification system for receiving the biometric identifier and information and documentation about the corporate entity, and verifying the at least one agent's identity and authority to act on behalf of the corporate entity, and verify the accuracy of the information and documentation.

10. The system of claim 6, further comprising a display device connected to a card reader and operative to display the information and documentation about the corporate entity to an agent of a credit-extending entity.

11. The system of claim 6, wherein the biometric corporate identification and documentation card comprises a means for connecting a power source.

12. The system of claim 11, further comprising a card reader, wherein the card reader comprises a means for transmitting power to the biometric corporate identification and documentation card via the means for connecting a power source.

13. The system of claim 6, wherein information about the corporate entity comprises financial information, biographical information, tax information, governmental information, or legal information.

14. The system of claim 6, wherein documentation about the corporation comprises digital versions of financial, legal, and governmental documents.

15. The system of claim 6, wherein the biometric corporate identification and documentation card comprises a biometric reader operative to collect a biometric identifier from the at least one agent.

16. A system comprising:
a card reader associated with a credit-extending entity, comprising:
a card interface operative to interface with a biometric corporate identification and documentation card necessary for applying for corporate credit digitally stored thereon;
a verification computer system, including a server, configured for determining credit eligibility based on verification of at least one agent's identity and authority to act on behalf of a corporate entity, and verifying the accuracy of the information and documentation received from the biometric corporate identification and documentation card; and
a communications module for transmitting a biometric identifier associated with at least one agent of a corporate entity, and information and documentation about the corporate entity.

17. The system of claim 16, wherein the biometric corporate identification and documentation card is associated with at least one agent of a corporate entity, and comprises:
a storage module operative to store a biometric identifier associated with the at least one agent, and information and documentation about the corporate entity.

18. The system of claim 17, wherein the biometric corporate identification and documentation card comprises a means for connecting a power source.

19. The system of claim 18, wherein the card reader comprises a means for transmitting power to the biometric corporate identification and documentation card via the means for connecting a power source.

20. The system of claim 17, wherein the biometric corporate identification and documentation card comprises a biometric reader operative to collect a biometric identifier from the at least one agent.

21. The system of claim 16, further comprising a verification system for receiving the biometric identifier and information and documentation about the corporate entity, and verifying the at least one agent's identity and authority to act on behalf of the corporate entity, and verify the accuracy of the information and documentation.

22. The system of claim 16, further comprising a display device connected to the card reader and operative to display the information and documentation about the corporate entity to an agent of a credit-extending entity.

23. The system of claim 16, wherein information about the corporate entity comprises financial information, biographical information, tax information, governmental information, or legal information.

24. The system of claim 16, wherein documentation about the corporation comprises digital versions of financial, legal, and governmental documents.

25. The system of claim 16, wherein the card reader comprises a biometric reader operative to collect a biometric identifier from the at least one agent.

\* \* \* \* \*